(12) United States Patent
Chopp

(10) Patent No.: US 12,266,008 B2
(45) Date of Patent: *Apr. 1, 2025

(54) SYSTEM AND METHOD FOR INTEGRATED RETAIL AND ECOMMERCE SHOPPING PLATFORMS

(71) Applicant: Shopfulfill IP LLC, Spring Valley, NY (US)

(72) Inventor: Shlomo Chopp, Spring Valley, NY (US)

(73) Assignee: Shopfulfill IP LLC, Spring Valley, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,076

(22) Filed: Oct. 3, 2023

(65) Prior Publication Data

US 2024/0046335 A1 Feb. 8, 2024

Related U.S. Application Data

(63) Continuation of application No. 18/085,113, filed on Dec. 20, 2022, now Pat. No. 11,861,681, which is a
(Continued)

(51) Int. Cl.
*G06Q 30/0601* (2023.01)
*G06Q 10/0837* (2023.01)
*G06Q 10/087* (2023.01)

(52) U.S. Cl.
CPC ..... *G06Q 30/0633* (2013.01); *G06Q 10/0837* (2013.01); *G06Q 10/087* (2013.01); *G06Q 30/0631* (2013.01); *G06Q 30/0641* (2013.01)

(58) Field of Classification Search
USPC .................................. 705/26.1–27.2
See application file for complete search history.

(56) References Cited

U.S. PATENT DOCUMENTS 6,622,127 B1 9/2003 Klots et al.
7,010,501 B1 3/2006 Roslak et al.
(Continued)

FOREIGN PATENT DOCUMENTS

KR 100762032 9/2007
KR 20150014578 2/2015

OTHER PUBLICATIONS

Trebilcock, B. (2015). Embracing robotics and streamlining fulfillment: Goods-to-person picking is just one of the processes that allows medline to meet its customers' stringent requirements. Modern Materials Handling, 70(6), 21(2). Retrieved from https://dialog.proquest.com/professional/docview (Year: 2015).*
(Continued)

*Primary Examiner* — Jeffrey A. Smith
*Assistant Examiner* — Ashley D Preston
(74) *Attorney, Agent, or Firm* — Kilpatrick Townsend & Stockton LLP

(57) ABSTRACT

Systems and methods for integrated retail and ecommerce shopping platforms. A shopping system for selling products including: a shopping facility including a primary product storage area; at least one showroom; at least one delivery location; a transport system for moving products between locations within the primary product storage area, the at least one showroom and the at least one delivery location; an inventory control system; a network server in operational communication with the inventory control system and the transport system, the network server adapted to transmit interactive shopping interface pages over a network; and a customer client device associated with one of the customers adapted to receive and display the interactive shopping interface pages, for selectively displaying product information about the products sold by the shopping system, and receiving customer input regarding the selecting and dese-
(Continued)

lecting of one or more of the products for possible purchase by the customer.

20 Claims, 6 Drawing Sheets

Related U.S. Application Data continuation of application No. 17/153,800, filed on Jan. 20, 2021, now Pat. No. 11,544,770, which is a continuation of application No. 15/935,041, filed on Mar. 25, 2018, now Pat. No. 10,915,941.

(60) Provisional application No. 62/476,801, filed on Mar. 26, 2017.

(56) References Cited

U.S. PATENT DOCUMENTS

| | | | | |
|---|---|---|---|---|
| 8,527,373 | B1* | 9/2013 | Ricci | G06Q 10/087 705/28 |
| 8,977,554 | B1 | 3/2015 | Hertschuh et al. | |
| 10,308,430 | B1 | 6/2019 | Brady et al. | |
| 10,748,072 | B1 | 8/2020 | Seeger et al. | |
| 10,915,941 | B2 | 2/2021 | Chopp | |
| 11,544,770 | B2 | 1/2023 | Chopp | |
| 11,861,681 | B2* | 1/2024 | Chopp | G06Q 30/0633 |
| 2002/0026380 | A1* | 2/2002 | Su | G06Q 30/0641 705/26.8 |
| 2006/0149640 | A1* | 7/2006 | Gordon | G06Q 30/0605 705/26.81 |
| 2010/0070338 | A1 | 3/2010 | Siotia et al. | |
| 2011/0191207 | A1 | 8/2011 | Schueller et al. | |
| 2013/0173330 | A1 | 7/2013 | Puskorius et al. | |
| 2013/0317916 | A1 | 11/2013 | Gopalakrishnan et al. | |
| 2014/0279294 | A1 | 9/2014 | Field-Darragh et al. | |
| 2014/0363059 | A1 | 12/2014 | Hurewitz | |
| 2014/0365334 | A1 | 12/2014 | Hurewitz | |
| 2015/0112826 | A1 | 4/2015 | Crutchfield, Jr. | |
| 2016/0259343 | A1 | 9/2016 | High et al. | |
| 2016/0283953 | A1 | 9/2016 | Ettl et al. | |
| 2016/0364786 | A1 | 12/2016 | Wankhede | |
| 2017/0206571 | A1 | 7/2017 | Dhawan et al. | |
| 2017/0330211 | A1 | 11/2017 | Deshpande et al. | |
| 2018/0032928 | A1 | 2/2018 | Li et al. | |
| 2018/0276602 | A1* | 9/2018 | Rivalto | G06Q 20/308 |

OTHER PUBLICATIONS

Business Wire, "Kiva Systems Announces Availability of Breakthrough Mobile Fulfillment System; Staples to Deploy Kiva System in Chambersburg Delivery Facility", Available online at: https://dialog.proquest.com/professional/docview/1071322878?accountid=161862, Dec. 19, 2005, 2 pages.

Business Wire, "Kiva Systems Launches Robot Rental Program for Fulfillment Center Automation", Available Online at: https://www.businesswire.com/news/home/20110614005178/en/Kiva-Systems-Launches-Robot-Rental-Program-for-Fulfillment-Center-Automation, Jun. 14, 2011, 2 pages.

U.S. Appl. No. 15/935,041, "Non-Final Office Action", Feb. 24, 2020, 41 pages.

U.S. Appl. No. 15/935,041, "Notice of Allowance", Dec. 15, 2020, 16 pages.

U.S. Appl. No. 16/579,516, "Advisory Action", Feb. 11, 2021, 3 pages.

U.S. Appl. No. 16/579,516, "Advisory Action", Jan. 29, 2024, 3 pages.

U.S. Appl. No. 16/579,516, "Final Office Action", May 10, 2022, 17 pages.

U.S. Appl. No. 16/579,516, "Final Office Action", Oct. 29, 2020, 18 pages.

U.S. Appl. No. 16/579,516, "Final Office Action", Sep. 29, 2023, 19 pages.

U.S. Appl. No. 16/579,516, "Non- Final Office Action", May 24, 2024, 19 pages.

U.S. Appl. No. 16/579,516, "Non-Final Office Action", Jan. 18, 2023, 19 pages.

U.S. Appl. No. 16/579,516, "Non-Final Office Action", Sep. 21, 2021, 21 pages.

U.S. Appl. No. 16/579,516, "Non-Final Office Action", Feb. 20, 2020, 28 pages.

U.S. Appl. No. 17/153,800, "Non-Final Office Action", Apr. 26, 2022, 35 pages.

U.S. Appl. No. 17/153,800, "Notice of Allowance", Aug. 18, 2022, 13 pages.

U.S. Appl. No. 18/085,113, "Non-Final Office Action", Apr. 11, 2023, 18 pages.

U.S. Appl. No. 18/085,113, "Notice of Allowance", Jul. 3, 2023, 12 pages.

Gomez et al., "Estimating Store Brand Shelf Space: A New Framework Using Neural Networks and Partial Least Squares", International Journal of Market Research, vol. 51, Issue 2, 2009, pp. 243-266.

PCT/US2018/024253, "International Search Report and Written Opinion", Jul. 13, 2018, 11 pages.

* cited by examiner

SYSTEM AND METHOD FOR INTEGRATED RETAIL AND ECOMMERCE SHOPPING PLATFORMS

CROSS-REFERENCE TO RELATED APPLICATIONS

This application is a continuation of U.S. application Ser. No. 18/085,113 by CHOPP, entitled "SYSTEM AND METHOD FOR INTEGRATED RETAIL AND ECOMMERCE SHOPPING PLATFORMS," filed Dec. 20, 2022, which is a continuation of U.S. application Ser. No. 17/153,800 by CHOPP, entitled "SYSTEM AND METHOD FOR INTEGRATED RETAIL AND ECOMMERCE SHOPPING PLATFORMS," filed Jan. 20, 2021, now issued U.S. Pat. No. 11,544,770, which is a continuation of U.S. application Ser. No. 15/935,041 by CHOPP, entitled "SYSTEM AND METHOD FOR INTEGRATED RETAIL AND ECOMMERCE SHOPPING PLATFORMS," filed Mar. 25, 2018, now issued U.S. Pat. No. 10,915,941, which claims priority to U.S. Provisional Application No. 62/476,801 by CHOPP, entitled "SHOPPING AND FULFILLMENT FACILITY," filed Mar. 26, 2017, the entire disclosure of which are hereby incorporated by reference, for all purposes, as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright whatsoever.

BACKGROUND OF THE INVENTION

Embodiments of the present invention generally relate to systems and methods for integrated retail and ecommerce shopping platforms.
Differentiation and Challenges of Online and Brick and Mortar Shopping Model Existing Shopping Center and mall facilities provide shoppers with products that once acquired, are taken home. Should a customer want a product delivered to avoid the need to take the product home or because the product is not in stock at the facility, for example, he or she may find it easier to write down the name of the product and then order it subsequently from an online shopping venue-all from the comfort of his/her home. This process is known as showrooming, and retailers in the past have decried this practice as being abusive of their heavy investment in brick and mortar stores by shoppers who will acquire from the competition.

Showrooming is a product of competition and brick and mortar stores ("BAM") not responding to the more data-rich and, at times, streamlined product sales and fulfillment processes offered by online retailers. BAM's may find it difficult to adapt to this trend due to the lack of efficient integration between BAM operations and online shopping fulfillment.

Online retailing also comes with its unique set of issues and costs. If an online shopper so desires, he/she may elect to order multiple products of the same nature and ultimately return all but the one they seek to keep. For example, a shopper seeking one pair of shoes might order five styles in two sizes (for a total of ten shoes) and return all but the one pair they choose to keep. By ordering multiple, related products at once, the shopper may observe the look and feel of the products directly, thereby providing a much more advantageous and desirable shopping experience compared to simply viewing pictures of the products on a computer screen. As a result, products are often returned and the expense of shipping, return shipping and restocking is often absorbed by the retailer often resulting in a net expense instead of a profitable sale. For online retailers, even those equipped with modern automated fulfillment centers, the expense hurts profit margins, but for BAM's, which also carry the costs of operating physical stores and an inefficient distribution network, attempting to be a BAM that also provides robust online retail offerings, such continued operations can ultimately result in significant financial loss or, in some cases, even bankruptcy.

Shoppers purchase products online primarily for convenience, variety of available product, and speed of information. Retail stores, on the other hand, provide two benefits that can dissuade a shopper from shopping online: (i) the ability to touch view, and size a product as well as (ii) speed between the time a product is ordered and the time benefits of the product may be enjoyed by the shopper, provided that the desired product is in stock.
The BAM Supply Chain BAM's have employed a store-centric model. i.e., the store was a BAM's way of connecting with their customers. BAM Retailer's departments are focused on the best possible and most efficient method to attract shoppers and sell products at their stores. BAMs have located in prime access locations, which make it easier for shoppers to visit them. Accordingly, planning, purchasing, logistics and warehousing have revolved around delivering product to stores in the most effective and efficient manner.

BAM locations generally consist of a showroom with shelf stock available for the shopper to add to their physical shopping cart or basket. As product levels at a store decline due to sales, regional warehouses send pallets of the declining product to a receiving area at the rear of the store, and the shelves are restocked accordingly. Typically, the product stock originates from manufacturers in large pallets of cases of mostly singular products that are transported to the retailer's regional distribution facility. At this facility, the pallets are separated or de-palletized, and the cases are combined into new pallets containing assortments of products for shipping to individual stores. The operation is one of scale and high quantity.
The Fulfillment Center Online shopping requires a different, direct to consumer Fulfillment Center model. Upon receiving the large pallets of cases of singular products, the pallet is separated and the cases are opened and the products are organized either on shelves or within an automated picking infrastructure in an orderly and efficient manner so that, once an online order is received, either robotic machines or humans (i.e., pickers) select individual product(s) for any size order, package the products and send the package to the address provided by the customer via its own package delivery company and/or a third-party package delivery company (e.g., Federal Express, United Parcel Service, etc.). The Fulfillment Center manages stock and processes orders, returns, and exchanges. This fulfillment of individual products in individual orders is known as "eaches."
Adaptation Challenges of BAM Retailers BAM's with traditional store centric supply chains have found it very difficult to integrate their existing logistics infrastructure with an efficient e-commerce fulfillment model. These historically low-margin BAMs were already under financial pressure from the loss of sales to online retailers, and they have found it difficult to create a robust eaches logistics network. While many retailers have attempted to modify their model somewhat to incorporate fulfillment centers into their distribution center accommodate accordingly, the results have more often than not been inefficient—adding further pressure to their razor-thin profit margins. Operating two distinct supply chains will result in excess and inefficient allocation of inventory as well as other logistical challenges. Furthermore, the BAM supply chain model includes many liabilities not essential to an online retailer, including but not limited to maintaining a more cumbersome infrastructure and retail space that often is too large for current sales volumes. This combination of a "less than ideal" infrastructure and store occupancy costs has driven notable former retail giants into distress, bankruptcy protection and even liquidation.

Third Party Logistics Providers

Some online retailers, such as Amazon, have created their own expensive supply chain and fulfillment networks. Other retailers have elected to use third party logistics companies ("3PLs") to outsource logistics, storage and fulfillment services. These services may include depalletizing, repalletizing, shipping, receiving, packaging, repackaging, storage picking, shipping and processing returns/exchanges. 3PLs serve to streamline their retailer clients' businesses. In this manner, a retailer can focus on market trends, sourcing product, projecting sales, and store layout (online or otherwise) and shopper experience.

For BAM clients, retail profit margins are generally thin. With reduced sales volume and a logistics infrastructure that isn't easily adapted to e-commerce fulfillment, BAMs are increasingly considering 3PLs to handle in-store distribution and/or e-commerce fulfillment as a response to this increased competition, declining sales and an evolving business model.

BRIEF SUMMARY OF THE INVENTION

Briefly stated, in one aspect of the present invention, a system for selling products to a plurality of customers is provided. This system includes a shopping facility including a primary product storage area adapted to store the products to be sold via the shopping system; at least one showroom in near proximity to or within the shopping facility, the showroom adapted to display at least a subset of the products to be sold via the shopping system; at least one delivery location; a transport system adapted to move selected ones of the products between locations within the primary product storage area, the at least one showroom and the at least one delivery location; an inventory control system adapted to monitor the location of one or more of the products located in at least one of the group consisting of: the primary product storage area, the at least one showroom, and combinations thereof, a network server in operational communication with the inventory control system and the transport system, the network server adapted to transmit interactive shopping interface pages over a network; and a network enabled customer client device associated with one of the customers adapted to receive and display the interactive shopping interface pages transmitted from the network server, the interactive shopping interface pages selectively displaying product information about the products sold by the shopping system, and being adapted to receive customer input regarding the selecting and deselecting of one or more of the products for possible purchase by the customer and to add selected ones of the one or more of the products to a virtual cart and to remove deselected ones of the one or more products from the virtual cart, and to communicate the customer input to the server over the network.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
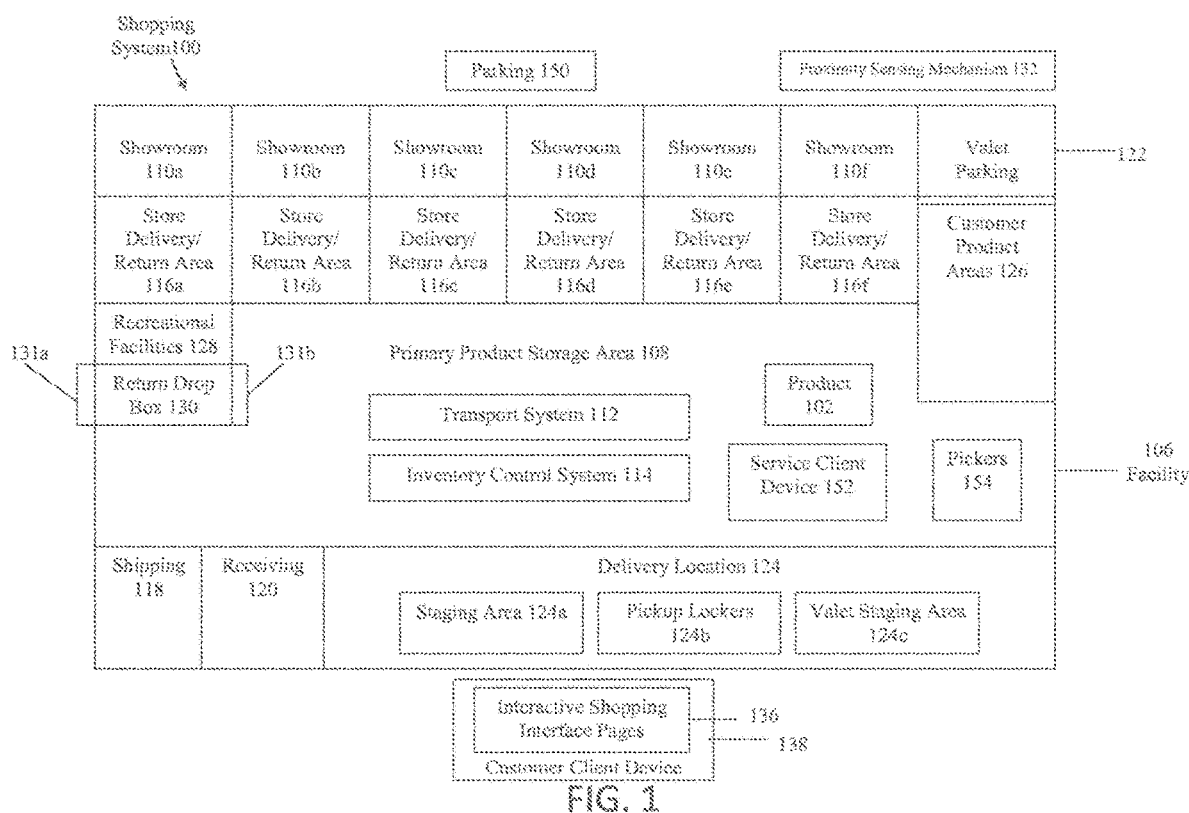
FIG. 1 is diagrammatic illustration of a shopping center with multiple showrooms, in accordance with the present invention.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Furthermore, the subject application references certain processes which are presented as series of ordered steps. It should be understood that the steps described with respect to those processes are not to be understood as enumerated consecutive lists but could be performed in various orders while still embodying the invention described herein.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

With traditional BAMs being difficult to integrate with e-commerce fulfillment logistics and technology, and online retailers being unable solve for the lack of touch/feel and the returns issue, a solution to this matter is the shopping system of the present invention such as shopping system 100 as described herein. Embodiments of the shopping system solve many problems and revolutionize shopping by, for example: (i) enhancing adaptable supply chain management, (ii) providing turnkey and adaptable e-commerce fulfillment, (iii) decentralizing the distribution network to store product, fulfillment ready in proximity to customers; (iv) providing for a more cost effective and maximized brick and mortar retail store by increasing display space and keeping increased stock nearby, with the ability to shop digitally in the store and hold within moments, buy products and have them delivered as the customer desires, (v) enhancing customer shopping experiences, (vi) increasing shoppers' spending per trip, (vii) reducing shipping and return expenses and customers' over-shopping merely to return, (viii) making showrooming profitable, and (ix) providing a retail business infrastructure.

The shopping system may include a building or set of buildings located near each other (referred to herein as a facility) that have a retail shopping center component (e.g., showrooms 110) and a warehouse distribution and fulfillment center component (e.g., primary product storage area 108, transport system 112, inventory control system 114, pickers 154, and/or service client devices 152) that is at times as large or larger than the retail component.

CONTRAST: The current BAM model involves warehouses/distribution centers to distribute product to stores located at a distance, usually miles from retail locations and purposefully not affiliated with any single store location. Additionally, in-store warehouses are short-term storage for larger items (that don't fit on shelves) waiting to be sold or are temporary storage for stocking shelves. The e-commerce fulfillment model is also driven by fulfillment centers not associated with a retail store or shopping experience.

In another embodiment, the shopping system makes up a decentralized distribution network, and manufacturers can ship product directly to the shopping system (bypassing the traditional tiered distribution network) using any method, including trailers which interface with a facility such as facility 106 via departments such as shipping 118 and receiving 120, which are configured to accommodate such deliveries. Facility 106 may store the product in a manner that allows for real-time fulfillment by pickers to serve in-store or online shoppers, who would receive the goods either by taking the product home from a visit to the shopping system facility, or by third party home delivery.

CONTRAST: Current fulfillment centers, do not pick product in real-time; embodiments of the shopping system may have that capability. Current retailer distribution and fulfillment center models do not operate in a manner to accommodate more than the occasional customer pickup (which generally is inefficient and time consuming), and do not serve as an alternative to in-store pickup or home delivery.

In another embodiment, the shopping system is also configured to receive and process returns and/or exchanges by, for example, return shipping, in-facility processing, pickup from a remote drop off box, and the like. A unified network of shopping systems would also allow for returns of product to a shopping system facility that does not sell the particular product and/or brand of product being returned, and may not house the retailer to whom the product is being returned.

CONTRAST: Currently, shoppers either return via package delivery services or by dropping off in store.

In yet another embodiment, similar to today's most desirable retail destinations, the shopping system is a one stop venue in which the shopper may enjoy dining, purchase products, experience entertainment, and can leave relaxed.

CONTRAST: Traditional distribution, fulfillment and warehouse facilities are not a desirable destination for shoppers.

In still another embodiment, the shopping system encourages shopper visits due to its ability to stock and display a vast amount of product since showroom space is primarily allocated to display of product rather than a combination of display and storage of product.

CONTRAST: One of the advantages of online shopping over BAM retail is that the selection is so vast. BAM retail does not typically have space to properly display similar quantities and selection of product and at the same time keep sufficient stock on hand for the customer to take home. In one embodiment, the shopping system's retail component does not store product but rather is a space-maximized showroom. The adjacent shopping system's primary product storage area component has the benefit of no aesthetic requirement and therefore can maximize product storage space—both horizontally and vertically.

In yet another embodiment, the shopping system encourages longer duration of shopping stay and, by extension, sales per shopper. Just as is the case with online shopping, a shopping system shopper is limited only by the amount of time and money he/she can spend and is not limited by or burdened by carrying bags of purchased product around the shopping system facility or to the car. With the shopping system of the present invention, a shopper may also shop without having to physically push a physical shopping cart and therefore is limited only by his or her time and budget. This feature of the present invention also facilitates shopping for customers with disabilities who are unable to handle physical products and/or a physical shopping cart. Such customers may include but is not limited to handicapped and elderly individuals. These individuals may use delivery methods such as home delivery, valet product delivery and the like to enable them to shop without a friend, aide, family member, or the like who would typically be required to handle the physical products and/or shopping cart.

CONTRAST: In the current BAM model, shoppers completing a purchase walk their purchases out of the store. Physically, an individual is therefore limited to shop only to the limits of his/her carrying capability. A shopper carrying product to his or her vehicle is often unlikely to walk back to the shopping facility, and is more likely to decide to drive away. The shopping system provides shoppers with the opportunity to pick up all of the products purchased during their trip at one time at the end of the shopping trip, in addition to various convenient methods of accomplishing the pickup (or delivery) of the purchased products.

In another embodiment, shoppers at a shopping system use their personal electronic device to add products to a virtual cart, and pick up these products at the end of the shopping day or have them delivered to their vehicle or home at a predetermined day and time. Should the shopper not be technologically savvy, accommodations can be made so that a shopping system employee can help, or various low-tech methods may also be incorporated. Furthermore, if the shopper's personal electronic device runs low on battery power, shopping system charging kiosks may be positioned throughout the shopping system facility. If the device has been provided by the shopping system, it can be exchanged for a fully charged one. If the device is owned by the customer, the customer may allow it to charge in a secure location while he or she borrows a shopping system-owned device until his or her device is again operational.

CONTRAST: Traditional retail properties do not accommodate in-store digital shopping as well as the delivery of products to vehicles, homes, or other places at a specific time.

In yet another embodiment, shoppers at the shopping system facility can see, touch and feel the products that they are adding to their virtual shopping carts. Furthermore, even if the customer shopped at home and elected to return or exchange a product, especially one that is selling out quickly, the shopper can visit the shopping system, confident that there is a sufficient selection for a substitute purchase. Shoppers may also select from home the products that they most likely prefer and then confirm such selection by touching and feeling the products in the shopping system facility.

CONTRAST: Shopping online, even with the intent to return can take weeks in selecting a suitable replacement product. Specific BAM locations are not able to stock and display the vast amounts of products shown online, resulting in the shopper encountering difficulties and delays in finding a desirable product. This results in the shopper returning online product via delivery service often at the expense of the retailer. Embodiments of the shopping system would reduce such costs and shopper difficulty as its stock is vast.

In still another embodiment, at the end of a day of shopping at a shopping system, the shopper can: (i) walk to his or her valet parked vehicle and find all of his or her product loaded into his or her trunk; (ii) line up at a drive-thru pick up and have an attendant load the car with the acquired products; (iii) reach his or her car finding a porter with the purchased products at the car waiting to load it for the shopper; (iv) go to the locker designated by the shopping system for the order and pick up the products purchased therefrom; (v) have the products shipped home by package delivery service; and/or (vi) have a shopping system delivery service deliver it to a specified location or address immediately upon purchase.

CONTRAST: Online shopping or BAM retail does not offer the majority of these types of product delivery services.

In another embodiment, the shopping system may have a plurality of arrangements with the individual retailer or showroom tenants. In a first arrangement, a third party logistics handler may handle all or some of the retailers' needs (including but not limited to receiving, stocking, picking, packaging, repackaging, fulfillment, delivery, technology, store design/layout, and store operations) as it relates to all the tenants in the shopping system resulting in the primary product storage area of the shopping system acting as one large warehouse. Or, in a second arrangement, the retailer showroom operates within the confines of the shopping system and operates its own portion of the primary product storage area resulting in several individually marked or physically demised sections of the primary product storage area.

CONTRAST: Current BAM shopping properties do not have the components of the shopping system described herein and therefore cannot offer these types of warehousing and fulfillment center services.

In some cases, it may be required for the retailer/showroom to keep stock or a portion of stock in the showroom. This may include, for example, grocers selling fruits and vegetables as shoppers are very specific as to their desired level of ripeness and look. With such a retailer, there would be stock held in the retail store/showroom itself but such stock would be very limited. For example, a pile of apples may seem to only be two layers deep to a shopper's eye. However, in reality, there may be a device such as a pressure plate restocking system that runs from the shopping system's primary product storage area directly into the showroom. This is but one example of automated restocking that may be employed in such circumstances.

In one embodiment, the shopping system is part lifestyle center and part hi-tech robotics fulfillment center. To the shopper it is an experience and to the retailer, it is a last-mile plug-and-play fulfillment center. The total network of shopping systems can function for a retail store as a retail infrastructure in a box. The cost of designing and "popping-up" a retail store as well as the cost of the on-boarding of technology tying into the retailers' current inventory and logistics systems is greatly decreased. Other than rental costs, the costs for the fulfillment center services provided to the retailers is tied to the stock on the shelves and the fulfillment of orders. In this manner, fixed costs are dramatically reduced.

In the shopping system of the present invention, a retailer does not have the costs of setting up and managing the fulfillment center component of the shopping center system because this component and the overall logistics network is provided as a turn-key service to the retailer. In other words, retailers can rely entirely on the shopping system's third party logistics ("3PL") company to handle its inventory, deliveries and returns. Furthermore, as technology evolves, the shopping system's dedicated 3PL maintains and upgrades the network at no direct cost to the retailer.

The shopping system's 3PL will have the ability to maintain a premier logistics network whereas traditionally individual retailers have found it to be financially prohibitive to do this. The shopping system's 3PL provider for the national network of shopping systems is able to bill the retailer tenants a cost for the 3PL service that is less than what they each individually would incur per item sold. This is because the 3PL has the benefit of spreading the cost of the robotics, technology and logistics operations and maintenance across all of the retailer tenants in the shopping system network with minimal downtime and greater efficiency.

The shopping system enhances the customer's experience because the showrooms are a blank slate that allows each retailer to implement its unique experiential showroom vision unencumbered by stock or by set store dimensions. The retailer is free to enhance the shoppers experience in many ways which may be regenerated by season or as desired.

The shopping system of the present invention provides the following tools to the retailer to facilitate the experiential enhancement: remote storage of products with on-demand recall into the customer's hands; a robust suite of integrated technology (e.g., applications, Web portal, Point of Sale, etc.) as well as the gamut of fulfillment and delivery options. And, a shopper will now have immediate access to all of the retailers items, rather than a limited subset, and those items will be located in its retail shops available to be taken home, i.e., e-commerce levels of inventory variety a mere drive away.

The shopping system of the present invention also addresses the challenge of e-commerce customer acquisition and retention as it is governed by the old adage of location, location, location. By locating these facilities at the best possible intersections in each market (e.g., replacing the regional mall), customer acquisition costs are significantly reduced and customer retention is now driven by product quality experience and convenience.

The shopping system also makes shopping more convenient for the customer because a shopper can commence his or her research and shopping at home using shopping system Web site, save the desired products to a shopping cart, go to the shopping system facility, and complete the purchase in the facility. Or, the customer can leave the facility without purchasing the product and continue the research and complete the purchase once returning home. Ultimately, more research means less returns, and more visits means higher customer loyalty. Shoppers now can decide whether to shop in-store or at home rather than being compelled to do either.

The shopping system of the present invention resolves the problem of retailers and the existing legacy "case" infrastructure have had issues adapting to and incorporating an "eaches" supply chain leaving shaky businesses with less than optimal processes. The shopping system of the present invention is retail infrastructure in a box. As a hybrid retail shopping/fulfillment center, inventory may arrive at the shopping system of the present invention palletized, and all product would exit as eaches whether for in-store or e-commerce fulfillment.

The shopping system of the present invention does not require bringing a customer's purchased products to the customer's vehicle. Rather, shoppers can pick up all of their products upon completion of all of their store visits or have the products shipped to home. Keeping shoppers away from their method of transportation and unencumbered by bags is a sure way to increase shopping trip longevity and profitability. And, while shopping online, shoppers comparing prices will also have to weigh the convenience of having a quicker delivery from (or visit to) a nearby shopping system.

The shopping system of the present invention does not require the retailer to undertake the investment in or operation of the infrastructure. The shopping system of the present invention allows the retailer to focus on its core competencies—sourcing, purchasing, marketing, and selling without being distracted by logistics, inventory management, order fulfillment, and the like—all tasks which would be undertaken by the dedicated 3PL of the shopping system of the present invention.

Further, logistics and supply chain technology is in a state of constant evolution. Retailers who have invested in a robust e-commerce fulfillment infrastructure have found it to require constant upgrading to keep pace with technology, and this upgrading is eating away at profits. Additionally, retailers that operate their own infrastructure have to carry its fixed overhead costs even between seasons. By relying on a logistics company whose primary business requires the maintenance of a state of the art logistics network, retailers realize significant savings.

Additionally, with the shopping system of the present invention, rebalancing stock between locations no longer requires cost prohibitive less than truckload ("LTL") shipping. It is a matter of reserving space on the scheduled balancing trucks. This is but one example of how servicing multiple retailer clients allows the shopping system of the present invention's 3PL to reduce retailers costs. Other benefits include a national return network, same day delivery at reduced prices, more precise inventory forecasting and strategic intelligence on new product and retailer rollouts.

The retailer does not have to relinquish control of its inventory. Similar to a software package, companies have the option to develop the necessary software in-house or, if available, to acquire it from a third party. If the company develops the program in-house, it is typically very costly and requires constant upgrades and maintenance. Alternatively, if the company purchases an outside program, it typically pays a monthly fee, and its data is held by someone else. The software may require some upfront customization, but it will be far less painful and costly to set up and maintain. The same applies to use of a 3PL. While an outside company is handling the retailer's logistics and inventory, the retailer is in total control of the process and has company personnel nearby. The retailer can use the 3PL services it needs and omit what it doesn't need.

Further, the shopping system of the present invention allows retailers to enter a market without any infrastructure investment. In its current form, the shopping network requires a regional distribution facility with enough capacity to make it financially feasible to open a quantity of stores that can generate sufficient sales to justify the entering of the market. Accordingly, a retailer must open enough stores to bring the regional network to capacity in order to make the endeavor profitable. With the shopping systems of the present invention, a retailer can open a single store without profitability and scaling concerns. Retailers can also benefit from massive amounts of anonymous data as well as retailer specific analysis. They can have the benefit of knowing what types of products sell in which market without testing it, and also have access to negative data to allow the retailer to plan accordingly.

Referring now to FIG. 1, depicted is a diagrammatic illustration of a shopping system 100 with multiple showrooms 110a-110f, in accordance with one embodiment of the present invention. FIG. 1 depicts a shopping system 100 including a shopping facility 106, referred to hereafter for brevity as the facility 106. In the depicted embodiment, facility 106 is a physical facility comprising at least one building housing most components of the exemplary system 100. However, it should be noted that facility 106 may comprise a plurality of independent or interconnected physical buildings rather than one large building without departing from the scope hereof.

The shopping system 100 sells products 102, and may optionally also sell or otherwise provide services via showrooms 110a-110f or recreational facilities 128. Products 102 may be received at the facility 106 from outside suppliers via, for example, receiving 120. While only one of product 102 is depicted in FIG. 1, in embodiments many products 102 are provided by the shopping system 100.

The facility 106 comprises at least one showroom 110, depicted in FIG. 1 as showrooms 110a through 110f. Although six showrooms are depicted, more or less showrooms 110 may be provided without departing from the scope hereof. In the depicted embodiment, each of the showrooms is a retail store that is independently owned and operated, but which shares in the use of the features of facility 106 with the other showrooms/retail stores, such features including without limitation, primary product storage area 108, transport system 112, inventory control system 114, parking, dedicated customer areas 126, staging area 124a, pickup lockers 124b, valet staging area 124c, shipping 118, receiving 120, and return drop box 130. The ability of a specific show room/retail store to share the expense associated with a system having the abilities of such components, as discussed in greater detail herein, allows retail stores to reduce overhead and remain competitive with other retain stores and e-commerce Web sites while also providing a full range of services that optimize the customer's shopping experience. For example, in some embodiments of the invention, facility 106 and one or more components thereof are optimized to provide all of the services one would typically expect from an e-commerce fulfillment center while also providing the services a typical retail store would expect from a retail warehouse. The ability to combine such services into one facility and to share them amount multiple retail stores allows retailers to provide a better shopping experience, and to maximize profits by reducing overhead costs. Although in the depicted embodiment, showrooms 110a through 110f are independently owned retail stores, alternate embodiments are envisioned in which one or more of such showrooms 110a-110f are owned and/or managed by the owner of facility 106 without departing from the scope hereof.

Shopping system 100 may be utilized by at least one customer, a human being physically visiting the facility 106 or shopping from a remote location via one or more network-enabled customer client devices 138. While only one customer is depicted, the present disclosure provides for more than one customer to physically or virtually visit the facility 106 or otherwise do business with the shopping system 100.

The facility 106 also comprises a primary product storage area 108, a transport system 112, and an inventory control system 114. Transport system 112 and inventory control system 114 include physical devices and subsystems as well as processor-executed software components that manage physical movement of products 102 between one or more locations within shopping system 100 including, but not limited to, primary product storage area 108, optional store delivery/return areas 116a-116f, showrooms 110a-110f, customer areas 126, delivery locations 124, return drop boxes 130, shipping 118, and receiving 120.

The facility 106 also includes at least one store delivery/return area 116 aligned and in embodiments physically attached to the at least one showroom 110 and able to receive product 102 from the transport system 112. The store delivery/return area 116 is a staging area or nearby backroom for the showroom 110 where pickers or transport system 112 may deliver products 102 requested by customers or employees working in showrooms 110 for viewing, purchase, or the like by customers. The store delivery/return area 116 may also temporarily hold products 102 returned by customers before the products 102 are retrieved for restocking by the transport system 112. As with the showrooms 110a through 110f, one each of store delivery/return area 116a through store delivery/return area 116f may be provided by the shopping system 100 to correspond with showrooms 110a through 110f, respectively, as depicted in FIG. 1. However, it should be noted that store delivery/return areas 116 are not required to implement the present invention. That is, product may be delivered directly to showrooms 110 or other areas of the shopping system for delivery to showrooms 110 without departing from the scope hereof.

The facility 106 also comprises shipping 118, receiving 120, parking 150, and valet parking 122, well-known functions which are common to retail facilities with accompanying warehouses. Shipping 118 and receiving 120 comprise floor space and equipment for outbound and inbound movement, respectively, of products 102. Parking 150 provides parking for customers of the shopping system 100 as needed, and valet parking 122 allows customers to have valets park their vehicles.

The facility 106 also comprises delivery location 124 that provides a variety of options for customers who wish to pickup purchased products 102 from facility 106. In the depicted embodiment, delivery location 124 includes a staging area 124a for a customer drive-through pickup line, pickup lockers 124b assigned to customers, and a valet staging area 124c. The valet staging area 124c corresponds to an in-car delivery method in which valet attendants are available to place purchased products 102 into vehicles of customers.

The facility 106 also comprises a plurality of customer product areas 126 in which the product selected by a customer is placed until the customer is ready for purchase and/or delivery of the product 102. That is, in the depicted embodiment of the invention, traditional physical shopping carts are not required. Rather, as a customer selects a product or deselects a product, for example, via a customer client device 138 or after a visual inspection, a picker 154 simultaneously adds selected corresponding physical products to and removes deselected corresponding physical products from a customer product area 126 associated with or dedicated to that customer. Therefore, it is not necessary for the customer to carry or cart physical products during the shopping experience. Dedicated customer product areas 126 may be any method of arranging a customer's products into one location including, but not limited to, carts, picking boxes, bins, shelving locations, crates, designated area, etc.

In the depicted embodiment, pickers 154 are humans that are equipped with service client devices 152 that provide instructions to the pickers regarding handling of the products and/or customers. However, alternate embodiments are envisioned in which pickers 154 are entirely electronic or robotic, and the products are placed and removed in the dedicated customer service areas 126 without the intervention of a human.

In the depicted embodiment, service client device 152 is a smartphone or other application compatible device owned or loaned to the picker 154. The application is downloaded to the device from an application store such as Google's Play Store or Apple's App Store and it communicates with network 410 of shopping system 100 via the Internet, as discussed in greater detail below. Service client devices 138 are adapted to receive and display, for example, instructions or other data including, without limitation: data regarding the products 102 selected or deselected by customers to which the respective picker 154 is dedicated; product suggestions for a customer of the respective picker 154; delivery instructions for a customer; and the like. This data may be transmitted from a server such as server 402 (FIG. 4) as discussed in greater detail below. However, alternate non-smartphone forms of service client devices may be substituted without departing from the scope hereof. Also, non-Internet communication methods may be substituted and information may be supplied by devices other than servers without departing from the scope hereof.

When a customer wishes to checkout, whether following a visit to an individual showroom/retail shop, or following the full shopping trip, either within the shopping facility or remotely therefrom, the products purchased by the customer and located in the customer product area 126 may be delivered to the customer as per the customer's selected delivery method as discussed in greater detail herein. In this manner, the overhead of the showrooms (e.g., retail stores)

is further reduced as there is no need for physical shopping carts or cash registers because purchases are made via customer client device 138 and are delivered using one or more of the delivery methods described herein. However, hybrid embodiments are also envisioned in which a shopper may use a physical shopping cart or otherwise carry product, and may purchase product from a traditional checkout/payment device without departing from the scope hereof. Further, embodiments of the invention are envisioned in which the customer product areas are omitted and the showrooms receive benefit solely from the sharing of costs associated with primary product storage area 108, transport system 112, and/or inventory control system 114.

The facility 106 also comprises recreational facilities 128 for use by customers which include restaurants, entertainment facilities, service providers, and combinations thereof to further enhance the shopping experience as known in the art. However, in the depicted embodiment, the customer may move easily between shopping and recreation product-free without the need to carry and secure bags of product and/or to store purchased products in, for example, a customer vehicle. This aspect of shopping system 100 greatly enhances the overall shopping experience, thereby encouraging customers to lengthen the shopping trip and/or increase the overall quantity of goods purchased.

In the depicted embodiment, the facility 106 further comprises a return drop box 130 for use by customers to place products 102 for return and potential refund. For example, return drop box 130 may be an electronic locker with both external access 131a (i.e., access located external to the facility 106) and internal access 131b (i.e., access internal to the facility 106). The external access allows a customer to securely place a return for processing by a picker 154 or other employee of the shopping system 100. The picker 154 or other employee, when ready, accesses the returned product via an internal locker access. However, return drop boxes are not required to implement the present invention.

The shopping system 100 also comprises customer client devices 138 which may be utilized by customers. In the depicted embodiment, customer client device 138 is a smartphone or other application compatible device owned by the user. The application is downloaded to the device from an application store such as Google's Play Store or Apple's App Store and it communicates with network 410 of shopping system 100 via the Internet, as discussed in greater detail below. Network-enabled customer client devices 138 are adapted to receive and display interactive shopping interface pages 136 transmitted from a server such as server 402 (FIG. 4) as discussed in greater detail below. However, alternate non-smartphone forms of customer client devices may be substituted without departing from the scope hereof. Also, non-Internet communication methods may be substituted and information may be supplied by devices other than servers without departing from the scope hereof.

The facility also comprises at least one proximity sensing mechanism 132 that may detect whether a customer is in close proximity to facility 106 and/or the customer's location within or proximal to facility 106. The proximity sensing mechanism may include any device and/or system capable of sensing location including, but not limited to, a camera, a GPS sensing device, a proximity sensing device, a plurality of sensors and gOS operating system in communication with a customer client device, an electronic communication between a customer client device 138 and the server 402, a GPS device located internal to the customer client device 138, an electronic communication protocol, and the like. Proximity sensing mechanism 132 may provide a variety of functions including, without limitation: prompting the customer with navigation style interactive shopping interface pages 136 via customer client device 138 to help the customer navigate to the desired location; prompting the customer to enter the location of the customer vehicle to facilitate valet delivery of any purchased products to the vehicle; identifying the location of a customer in order to provide product for inspection to the customer location; identifying the location of a customer in order to provide assistance to the customer including medical assistance, technical assistance, or the like. However, proximity sensing mechanisms may be omitted and are not required to implement embodiments of the present invention.

The shopping system 100 also comprises customer client devices 138 which may be utilized by customers. In the depicted embodiment, customer client device 138 is a smartphone or other application compatible device owned by the user. The application is downloaded to the device from an application store such as Google's Play Store or Apple's App Store and it communicates with network 410 of shopping system 100 via the Internet, as discussed in greater detail below. Network-enabled customer client devices 138 are adapted to receive and display interactive shopping interface pages 136 transmitted from a server such as server 402 (FIG. 4) as discussed in greater detail below. However, alternate non-smartphone forms of customer client devices may be substituted without departing from the scope hereof. Also, non-Internet communication methods may be substituted and information may be supplied by devices other than servers without departing from the scope hereof.

The interactive shopping interface pages 136 are selectively displayed to the customer and receive input from the customer as needed to achieve the benefits and goals of the present invention. The various interactive shopping interface pages 136 are described throughout and may include, but are not limited to, pages for: conveying information about products 102 sold by the shopping system 100; receiving information from the customer regarding selected and deselected products; displaying a customer's virtual cart to the customer; allowing a customer to purchase products; allowing a customer to input product delivery method, time, and/or location; displaying navigational pages to the customer; and allowing the customer to request a product for inspection at the customer's location or some other location. The interactive shopping interface pages 136 allow the customer client devices 138 to facilitate communication between the shopping system 100 and the customers over wireless network connections as described in greater detail herein.

In some embodiments of the invention, the customer client device has the ability to display the virtual cart to the customer via a pictorial image of a shopping cart with the selected items pictured in the pictorial image of the shopping cart. That is, the customer client device may display an interactive shopping interface page(s) that look like a shopping cart within which a customer can see all of the products that were selected by a customer. Via the user interface of the customer client device, the customer may also select a product from within the cart and, with hand gestures or the like, flip the product around and view it from all angles. In one such embodiment, when the customer views its customer client device, the customer sees an aerial view of a shopping cart with products stacked in it, wherein the customer can move products around to uncover other products and pick up individual products to take a closer look at it including, without limitation, specifications, nutritional information, size, etc. Such a feature would alleviate one of the challenges with shopping online in that many shoppers prefer the four dimensional, immersive experience of shopping in a BAM. That is, many shoppers like to swivel their heads and see massive amounts of products and also pick up the product in their hands and view it in multiple directions. The aforementioned feature would act to make the online shopping experience more akin to the retail or BAM shopping experience.

Although customer client device is described above as a smartphone capable of use in and proximal to facility 106, such a device may also be used from the convenience of the customer's home for ordering products in a traditional ecommerce manner for shipment to the customer's home for ordering products via a Web site for pickup at the facility 106. Furthermore, customer client device may also be a personal computer or other device located in the home of the customer or some other location capable of accessing the server 402 via a network 410 such as the Internet or the like.

Additionally, server 402 may be located within facility 106 or at a remote location without departing from the scope of the present invention. Server 402 may also be a cloud device as further described herein.

In the depicted embodiment, server 402 is also in operational communication with inventory control system 114 and, optionally, transport system 112. Inventory control system 114 may be as known in the art and is used for tracking and monitoring the quantity of individual products available via the shopping system. Furthermore, in the depicted embodiment, inventory control system 114 may be enhanced to maintain the location of each product 102 to allow for such products to be quickly located and transported to the necessary locations as requested by a customer or employee of the shopping system 100. Such transportation may be accommodated by transport system 112.

Figure 2:
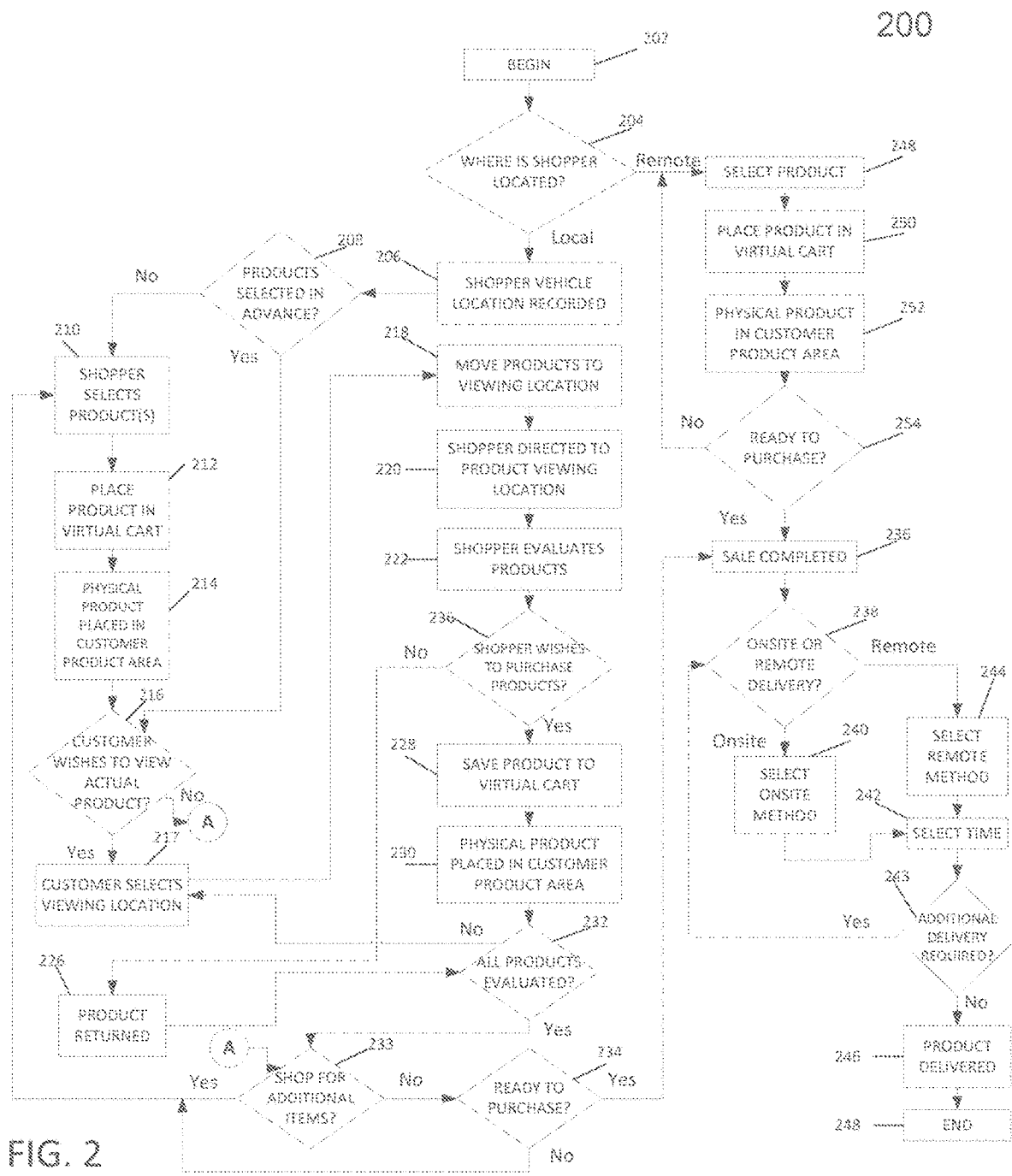
FIG. 2 is a process of utilizing the shopping system of FIG. 1 in accordance with one embodiment of the present invention.

Turning now to FIG. 2, depicted is a flowchart of a process 200 of utilizing the shopping system 100 of FIG. 1 in accordance with one embodiment of the present invention. The process 200 begins at block 202. At decision point 204, the process 200 determines if the shopper, i.e. the customer, is located locally or remotely. This may be determined, for example, via a proximity sensing mechanism 132 or the like. If the customer is located locally, the location of the shopper's vehicle is recorded at block 206. This information may be recorded automatically if the proximity sensing mechanism 132 has the accuracy to pinpoint the location of the car to the parking spot location. Or, in some embodiments, the customer is prompted to manually enter a parking location or parking spot number via an interactive shopping interface page 136.

Process 200 then proceeds to decision point 208, at which process 200 determines whether one or more products have been selected in advance of visiting facility 106. For example, the customer may have shopped from home or another remote location via a customer client device prior to visiting facility 106. If no products were selected in advance of the customer's trip to facility 106, the shopper selects product(s) at block 210, product(s) are placed in a virtual cart at block 212, and physical product(s) are placed in a dedicated customer product area 126 at block 214.

Products 102 may be selected by the customer at block 210 using a variety of methods. In one embodiment, the customer selects a sample product displayed in a showroom 110. In some instances, such selection involves scanning the product or a tag associated therewith with a customer client device 138. Or, a customer may select a product via an interactive shopping interface page without viewing the actual product. This may occur, for example, if the customer is located in a recreational facility 128 or some non-showroom area of facility 106. For example, while a customer is eating or performing some other activity, a customer may wish to browse and select digital images of products provided to the customer via interactive shopping interface pages provided by customer client device 138 for pickup or purchase after conclusion of the activity.

At decision point 216, the customer decides whether he or she wishes to view one or more of the actual products the customer will be purchasing. For example, if the product was chosen as a sample in a showroom, the customer may wish to view the actual product the customer would receive. Or, if the client chose the product digitally from a picture provided by a interactive shopping interface page, the customer may wish to view, handle, and feel the actual product. If no, process 200 proceeds to 234 as discussed below. If yes, process 200 proceeds to 217, at which the products the customer wishes to view and the product viewing location is selected by the customer. At block 218, the product(s) selected for viewing is/are moved to the viewing location selected by the customer at 217 via, for example, transport system 112. In some embodiments, the viewing location may be the current location of the customer even if the customer is not stationary. In such embodiments, a shopping system employee may bring the product to the current location of the customer once the product is received from the primary product storage area 108 via transport system 112. The employee will be notified on his or her service client device 152 of such location, which may be sensed by proximity sensing mechanism(s) 132.

At block 220, the shopper is directed to the product viewing location if the customer is not already present in the viewing location. This may be determined, for example, by an employee, a proximity sensing mechanism 132, or the like. At block 222, the shopper evaluates the product(s) 102 by viewing, touching, holding, donning the product, etc.

Returning to decision point 208, if the product has been selected in advance of the customer's visit to facility 106, the process 200 proceeds directly to block 216 to query whether the user wishes to view the product. The process 200 then proceeds as described above.

Continuing from block 222, the process 200 proceeds to decision point 224, at which it is determined if the shopper wishes to purchase the products. If yes, process 200 proceeds to 228, at which the products are saved in a virtual cart if they have not been previously placed in the virtual cart. Similarly, if the product is placed in a virtual cart at block 228, then, at block 230 the physical product is placed in the dedicated customer product area 126. The process 200 then proceeds to decision point 232.

Returning to decision point 224, if the shopper does not wish to purchase the product, process 200 proceeds to block 226 at which the product is deselected from the customer's virtual cart, if present therein, and it is returned via transport system 112 or the like to primary product storage area 108. In some embodiments, the product is returned to its designated storage area by a robotic or human picker. The process 200 then proceeds to decision point 232.

At decision point 232, it is determined whether all products desired to be evaluated have been evaluated by the customer. If no, the process 200 returns to block 217, at which the customer selects the desired products for viewing and a viewing location. Alternatively, if at 232, all products have been evaluated, the process 200 proceeds to decision point 233, at which it queries whether the user wishes to shop for additional items. If yes, process 200 returns to 210, at which the customer/shopper may select additional products. If no, process 200 proceeds to decision point 234, at which it queries whether the customer is ready to purchase one or more of the selected products. If no, process 200 returns to block 210, and proceeds as discussed above. If the answer to the question Ready to purchase?" is yes, the customer wishes to purchase some or all the products. Process 200 proceeds to block 236, at which payment is made by the customer for the products the customer is purchasing, and the sale is completed. For example, customer client device 138 may provide one or more payment related interactive shopping interface pages to the customer to allow the customizer to authorize an electronic payment such as, but not limited to, credit card, PayPal, Venmo, or the like. However, other methods of purchasing products may be substituted without departing from the scope hereof.

In the depicted embodiment, any unpurchased items may be left in the dedicated customer product area so long as the customer keeps such items in his or her virtual cart. This allows the customer to purchase the products at a later time.

After the sale is completed at block 236, process 200 proceeds to decision point 238, at which it queries whether the product delivery will be onsite or remote and which of the purchased products will be delivered in that manner. If a portion of the products are to be delivered onsite and a portion will be delivered remotely, the user will choose one method to enter first and will be able to revisit to add a second entry method on a later screen. If onsite, an onsite method is selected at block 240. Any onsite method may be included without departing from the scope of the present invention including, but not limited to, carry out, a customer drive-through pickup line where product can be picked up from a staging area 124*a*, pickup lockers 124*b* assigned to customers, and an in-car delivery method in which valet attendants are available to place purchased products 102 into vehicles of customers.

If at decision point 238, delivery is to be remote, at block 244 a remote method is selected. Remote methods may include, but are not limited to, shipment of products to an address, driver delivery of products to an address, and the like.

Regardless of the type of delivery selected by the customer, in some embodiments, optionally, the customer may pick a delivery (or pickup) time at block 242. However, this feature is not required to implement the present invention. Next, at 243, process 200 prompts the user to input whether additional deliveries are required. If yes, process 200 returns to 238. If no, process 200 proceeds to 245, at which the product is delivered. Then, the process 200 ends at block 248.

Returning to the beginning of the process 200, if at decision point 204 it is determined that the shopper is remotely located, the process 200 proceeds to block 248, at which product(s) are selected by a customer via a customer client device such as a smart phone, personal computer or the like. At block 250, the product(s) selected at 248 are placed in a virtual cart, thereby causing the picker to be notified. At 252, a picker places the physical product(s) corresponding to those in the virtual cart in a dedicated customer product area 126.

Process 200 then proceeds to decision point 254, at which it queries whether the customer is ready to purchase the selected products. If no, process 200 returns to block 248 to allow the customer to select additional products. Alternatively, if the customer is ready to purchase, process 200 proceeds to 236, at which process 200 proceeds as described above.

Figure 4:
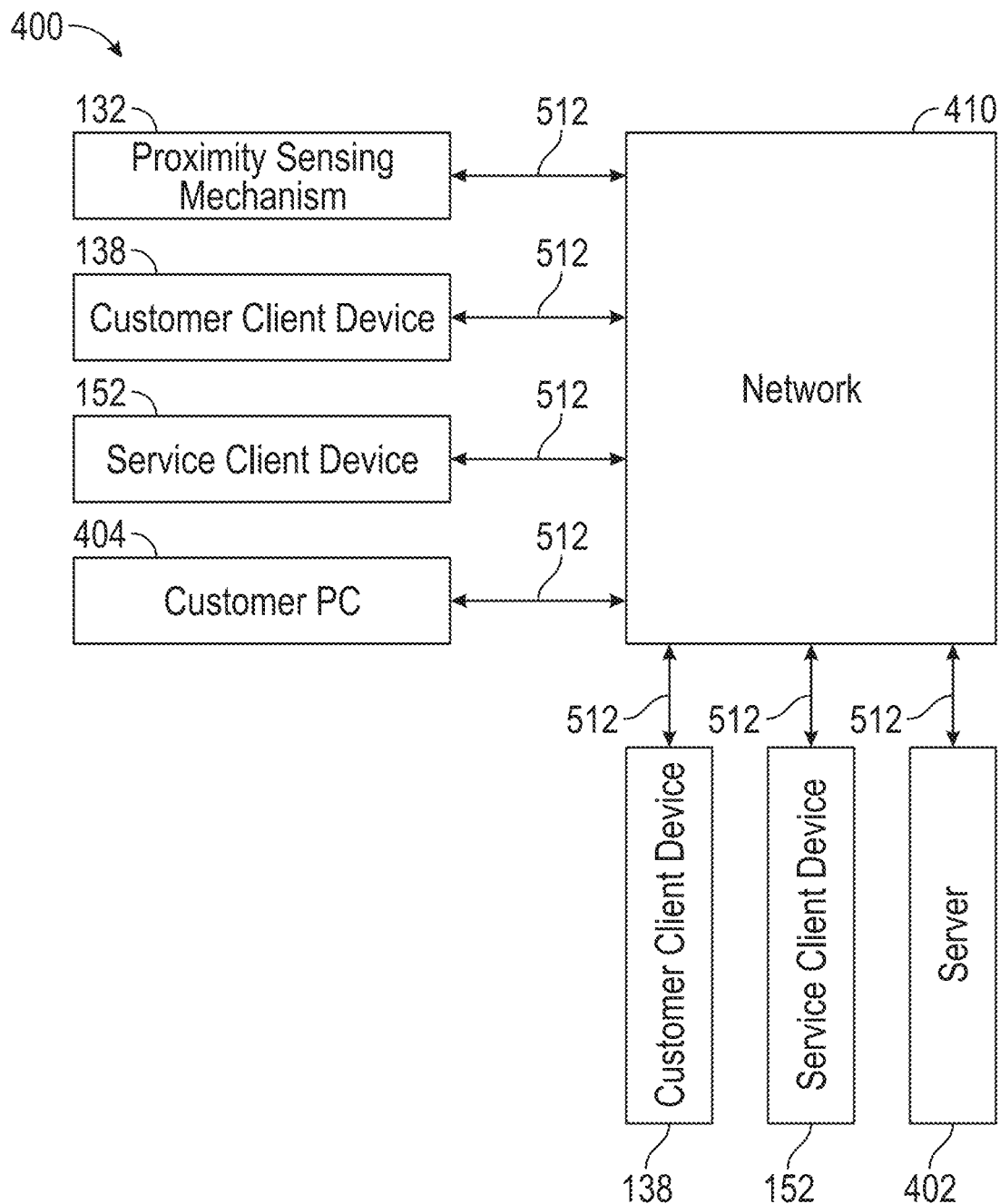
FIG. 4 depicts a schematic view of an exemplary network environment within which various embodiments of the present invention may be implemented.
Figure 5:
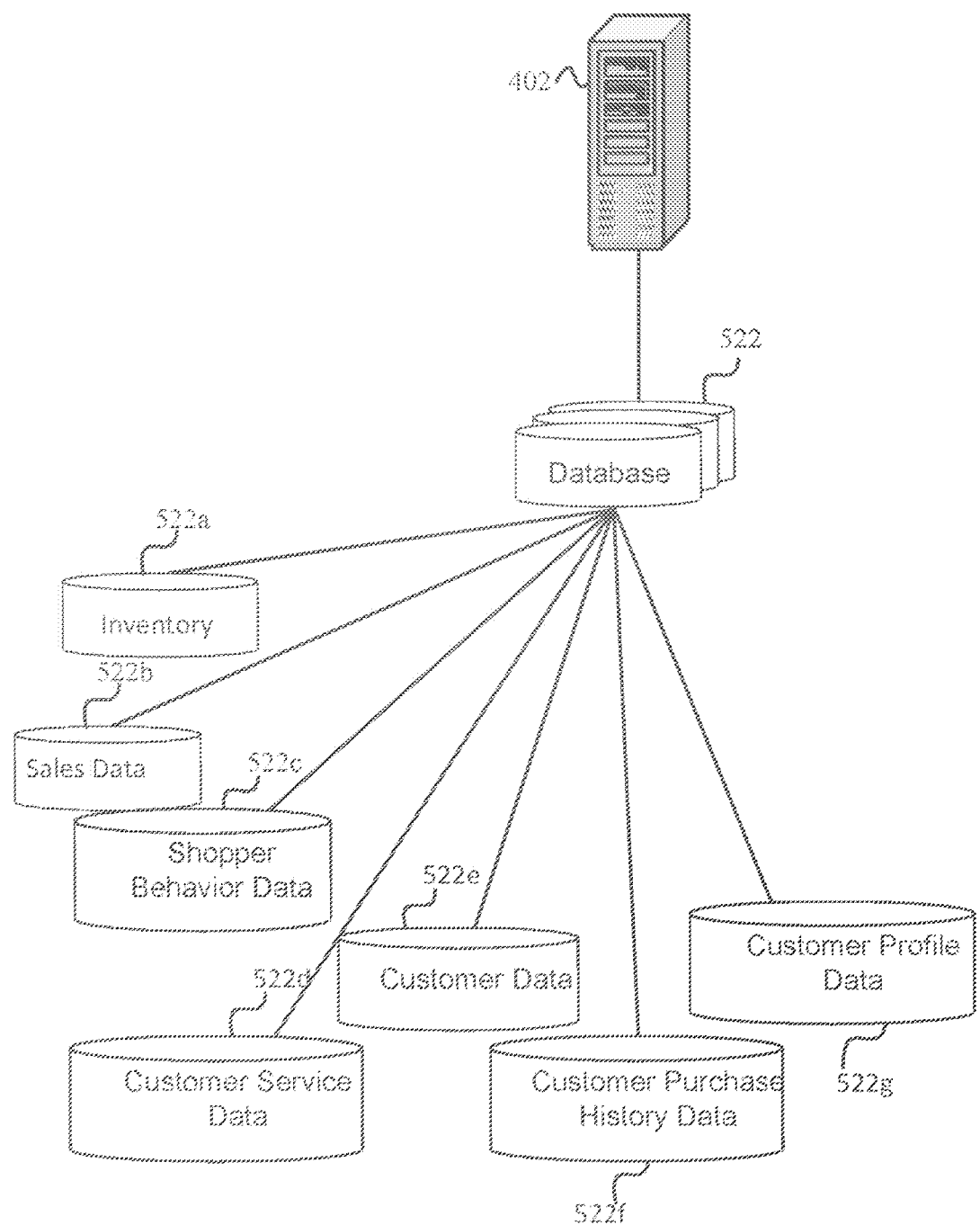
FIG. 5 depicts an exemplary set of content stores for use with the exemplary network environment depicted in FIG. 4 in accordance with one embodiment of the present invention set forth in FIGS. 1 and 2.

Turning now to FIG. 4, depicted is an exemplary computing system environment 400 for allowing a user of a computing device 302 (described in detail below) to receive content via a network and/or server such as server 402 and to perform the techniques described herein with respect to FIGS. 1 and 2. Such a network-based embodiment is suitable for allowing customers to purchase products 102 via shopping system 100 as per the present invention as described herein. The depicted computing system environment is only one example of a suitable computing environment and is not intended to suggest any limitation as to the scope of use or functionality.

This exemplary system includes, inter alia, a plurality of computing devices 302 and server 402, which interface to each other via network 410. Server 402 includes has access to, either directly or indirectly via a cloud or the like, content stores 522*a* through 522*g*, wherein data and/or data files are stored. In some environments, content stores 522 may include, but are not limited to, an inventory content store 522*a*, sales data content store 522*b*, shopper behavior content store 522*c*, customer service data content store 522*d*, customer purchase history data 522*f*, and customer profile data 522*g* (which may include customer payment data such as saved credit card information and the like). Such data may be located in a content store resident on server 402, an independent content store or other memory accessible by server 402, a similar content management system, a disk storage or other similar system suitable for storing and accessing electronic files.

Content store 522 may have one or more content files including, but not limited to, interactive shopping interface pages which are accessible from and/or are provided by server 402 to computing devices 302 via network 410. In certain embodiments, a server 402 provides networked access (through download or streaming) to the content files via communication connections 512 to make those files accessible on a computing device 302 such as, but not limited to, customer client devices 138, service client devices 152, and customer personal computer 404. It should be noted that computing devices 302 have a system memory suitable for local, temporary, or permanent storage of content files. In some embodiments of the present invention, network 410 is the Internet and computing device has an Internet connection that allows content to be downloaded, streamed, or the like from the remote server 402. The depicted computing system environment depicted in FIG. 4 is exemplary of one suitable computing environment and is not intended to suggest any limitation as to the scope of use or functionality. Numerous other general purpose or special purpose computing system environments, computing devices, and configurations may be used or substituted. Examples of well-known computing systems, devices, environments, and/or configurations that may be suitable for use include, but are not limited to, personal computers ("PCs"), server computers, handheld or laptop devices, multi-processor systems, microprocessor-based systems, network PCs, minicomputers, mainframe computers, e-readers, cell phones, tablets, embedded systems, distributed computing environments that include any of the above systems or devices, and the like.

Figure 3:
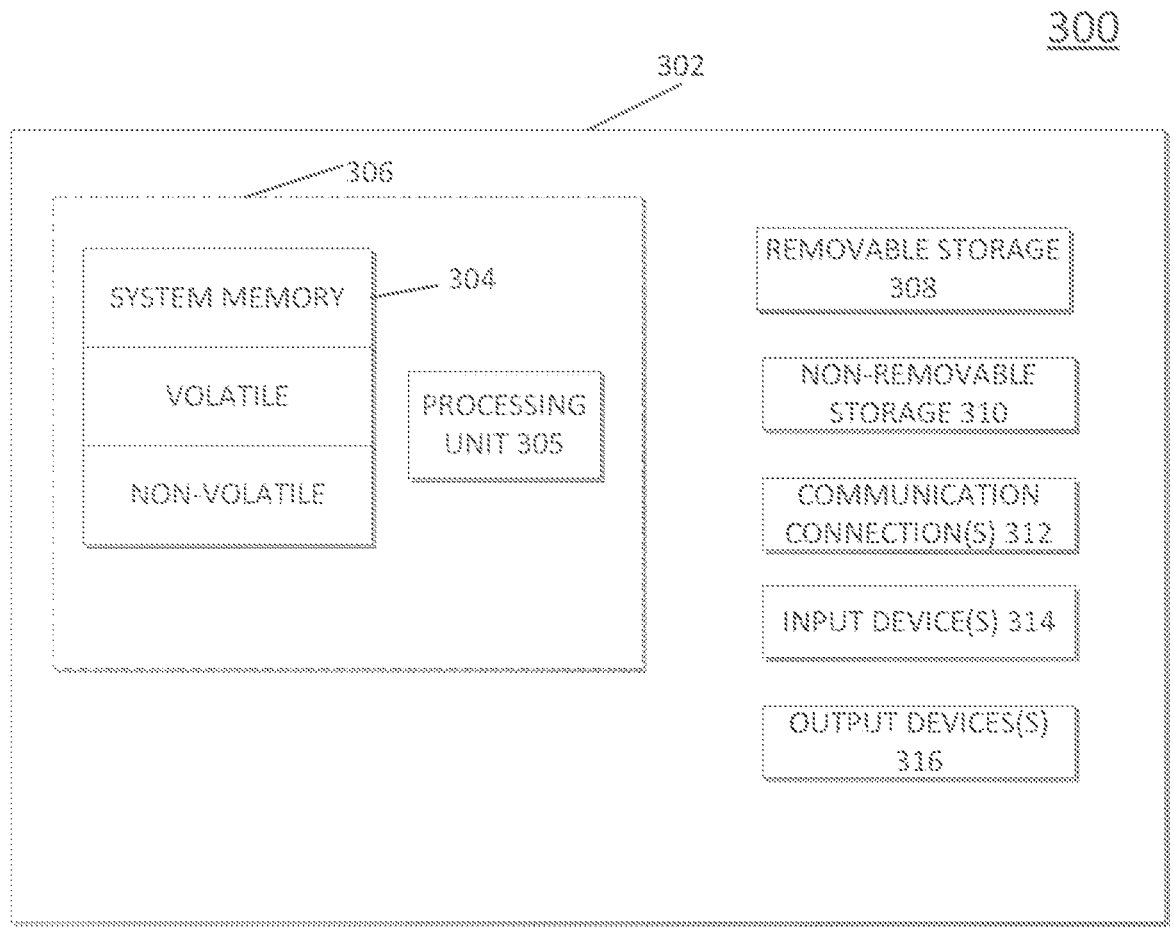
FIG. 3 depicts a block diagram of an exemplary computing device with which various embodiments of the present invention may be implemented.

FIG. 3 depicts a schematic view of an exemplary computing device 302 on which will various embodiments of the present invention may be implemented in a standalone manner or in a networked manner as described herein. It should be noted that server 402 is in itself a computing device and has a substantially identical or similar structure to that discussed for computing device 302.

In the present invention, a computing device 302 may be customer client devices 138, service client devices 152, customer personal computers 404, and the like that communicate with one or more servers 402 via a network or Internet via the processes described herein with respect to FIGS. 1 and 2 to provide the shopping system 100 as described herein.

Computer-executable instructions such as programs or program modules executed by a computing device or processing unit may be used. Generally, program modules include routines, programs, objects, components, data structures, etc. that perform particular tasks. Distributed computing environments may be used where tasks are performed by remote processing devices that are linked through a communications network or other data transmission medium. In a distributed computing environment, program modules and other data may be located in both local and remote computer storage media including memory storage devices.

Computing device 302, in its most basic configuration as depicted in FIG. 3, includes at least one processing unit 305 and at least one memory 304. Depending on the exact configuration and type of the computing device, memory 304 may be volatile (such as random-access memory ("RAM"), non-volatile (such as read-only memory ("ROM"), flash memory, etc.), or some combination of the two. In addition to that described herein, computing device 302 can be any network-accessible device (e.g., cell phone, smart phone, e-reader, personal computer, or the like) including those operating via Android, Apple, and/or Windows mobile or non-mobile operating systems.

Computing device 302 may have additional features/functionality. For example, computing device 302 may include additional storage (removable and/or non-removable) including, but not limited to, magnetic or optical disks or tape, thumb drives, and external hard drives as applicable. Such additional storage is illustrated in FIG. 3 by removable storage 308 and non-removable storage 310.

Computing device 302 typically includes or is provided with a variety of computer-readable media. Computer-readable media can be any available media that can be accessed by computing device 302 and includes both volatile and non-volatile media, removable and non-removable media. By way of example, and not limitation, computer-readable media may comprise computer storage media and computer memory which contains on a transitory basis communication media that are streamed to computing device 302 via communication connections 312.

Computer storage media includes volatile and non-volatile, removable and non-removable media implemented in any method or technology for storage of information such as computer-readable instructions, data structures, program modules or other data. Memory 304, removable storage 308, and non-removable storage 310 are all examples of computer storage media. Computer storage media includes, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can accessed by computing device 302. Any such computer storage media may be part of computing device 302 as applicable.

Computing device 302 may also contain communications connection 312 that allows the device to communicate with other devices. Communication media typically embodies computer-readable instructions, data structures, program modules and/or other data in a modulated data signal such as a carrier wave or other transport mechanism and includes any information delivery media. The term unmodulated data signal" refers to a signal that has one or more of its characteristics set or changed in such a manner as to encode information in the signal. By way of example, and not limitation, communication media includes wired media such as a wired network or direct-wired connection, and wireless media such as acoustic, radio frequency ("RF"), infrared and other wireless media. The term computer-readable media as used herein includes both storage media and communication media.

Computing device 302 may also have input device(s) 314 such as keyboard, mouse, pen, voice input device, touch input device, etc. Output device(s) 316 such as a display, speakers, printer, etc. may also be included. All these devices are generally known to the relevant public and therefore need not be discussed in any detail herein except as provided.

Notably, referring back to FIG. 4, computing device 302 may be inter-connected with network 410. As may be appreciated, network 410 may be any appropriate network and computing device 302 may be connected thereto by way of an interface such as communication connections 512 in any appropriate manner, and computing device 302 may communicate with one or more of the other computing devices via network 410 in any appropriate manner. For example, network 410 may be a wired network, wireless network, or a combination thereof within an organization or home or the like and may include a direct or indirect coupling to an external network such as the Internet or the like. Likewise, network 410 may be such an external network including, without limitation, the Internet.

Computing devices 302 may connect to server 402 via an internal or external network. Although FIG. 4 depicts computing devices 302 such as customer client devices 138, service client devices 152, and customer personal computers 404, and proximity sensing mechanisms 132, located in close proximity to server 402, this depiction is not intended to define any geographic boundaries. For example, when network 410 is the Internet, computing devices can have any physical location. For example, a computing device may be a tablet, cell phone, personal computer, e-reader, or the like located at any user's office, home, etc. Or computing device could be located proximate to server 402 without departing from the scope hereof. Also, although FIG. 4 depicts computing devices 302 coupled to server 402 via network 410, computing devices may be coupled to server 402 via any other compatible networks including, without limitation, an intranet, local area network, or the like.

In FIG. 4, the depicted embodiment of system 400 uses a standard client server technology architecture, which allows users of system 400 to access information stored in content stores 522 via a user interface. The application or program may be in communication with a server such as server 402 which is accessible via a network such as the Internet using a publicly addressable Uniform Resource Locator ("URL") to receive content to display. For example, users can access content from exemplary system 400 using any web-enabled device equipped with a web browser. Communication between software component and sub-systems are achieved by a combination of direct function calls, publish and subscribe mechanisms, stored procedures, and direct SQL queries, however, alternate components, methods, and/or sub-systems may be substituted without departing from the scope hereof. information about the request as well as the requested content. However, alternate methods of computing device/server communications may be substituted without departing from the scope hereof.

In the depicted embodiment, computing device 302 may be equipped with one or more Web browsers to allow them to interact with server 402 via a Hypertext Transfer Protocol HTTP functions as a request-response protocol in client-server computing. For example, a web browser operating on computing device 302 may execute a client application that allows it to interact with applications such as the inventory control system 114 and/or transport system 112, which are executed by one or more servers 402. The client application submits HTTP request messages to the server. Server 402, which provides resources such as HTML files and other content or performs other functions on behalf of the client application, returns a response message to the client application upon request. The response typically contains completion status information about the request as well as the requested content. However, alternate methods of computing device/server communications may be substituted without departing from the scope hereof.

In the exemplary system 400, computing device 302 stores in its system memory 304 (FIG. 3A) one or more data files (e.g., files that contain selected and deselected products, customer apparel sizing information, customer vehicle location, etc.) stored in a format suitable for transferring over the network and processing at the server 402. Examples of suitable file formats for content stored in the content store include: ASCII, PDF, TXT, .DOC, .lrf, .lrx, .chm, .epub, or the like.

As shown in FIG. 3, a computing device 302 has a system memory that is locally attached and/or integrated into computing device 302. The local content store contains files suitable for processing by the system described herein. Such files may be obtained for storage on the memory 304, removable storage 308, and/or non-removable storage 310 through various techniques including, but not limited to, having been: downloaded via a network connection (e.g., from a network via communication connection 512); stored in a local buffer as a part of a media stream; pre-loaded on memory 304, removable storage 308, and/or non-removable storage 310; generated locally at the computing device; transferred from a removable storage device 308 (e.g., a flash drive) to memory 304; or similar methods of obtaining electronic files for storage on a storage device.

It should be understood that the various techniques described herein may be implemented in connection with hardware or software or, as appropriate, with a combination of both. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter (e.g., through the use of an application-program interface ("API"), reusable controls, or the like). Such programs may be implemented in as code in a high-level procedural or object-oriented programming language to communicate with a computer system. However, the program(s) can be implemented in assembly language or machine language, if desired. In any case, the code may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as system 400 or a distributed computing environment. Still further, aspects of the presently disclosed subject matter may be implemented in or across a plurality of processing chips or devices, and storage may similarly be effected across a plurality of devices in or connected with system 400. Such devices might include personal computers, network servers, and handheld devices (e.g., cell phones, tablets, smartphones, etc.), for example. In the exemplary embodiment, computing device 302 is programmed to execute a plurality of processes including those referenced with respect to FIGS. 1 and 2 as discussed in greater detail herein.

Further, in some embodiments of the present invention, server 402 is equipped with predictive applications that execute probability scenarios related to the interest of a customer based upon historical customer data in an effort to recommend products and effectively position pickers to respond quickly and easily to customer requests. Similarly, historical customer behavioral data may be collected and analyzed in order to: inform retailers regarding the products that will sell well in a specific market, location, and/or demographic; inform retailers on product orders and recommendations for balancing stock; based on computer analytics of sales volumes and customer interest, detect that a product is selling well in one shopping system location but not in another and can initiate a balancing of stock between these locations ahead of a stock shortage; and prepare recommendation related interactive shopping interface pages to be provided to a customer.

EXAMPLE

Upon entering a store, a shopper will be enveloped in a welcoming and sales driven environment such as showrooms 110*a*-110*f* focused on product presentation, maximum customer/product interaction, and a greater certainty that when a shopper purchases a product, it will not be easily returned.

Let's follow a shopper, we will call her Jane. Jane had visited shopping system 100 from the comfort of her home via a customer client device and found a pair of shoes that she liked, but had to see it in person to feel the texture and make certain that the sizing fit her properly. Jane, using interactive shopping interface pages provided by her customer client device (in this example, a shopping system application downloaded to her smartphone and/or using her personal computer at home), added the product to her shopping system 100's virtual cart.

The next day, Jane visits the facility 106 of her local shopping system 100. As soon as she nears the facility 106 or the parking lot thereof, one or more proximity sensing mechanisms 112 alert an application executing on server 402 that Jane has entered the parking area or is otherwise near the facility 106. The server 402 notifies the shopping system application resident on her personal electronic device via network 410 that Jane is proximal to facility 106. The personal electronic device (e.g., acting as the customer client device 138) receives the message and activates the application on the personal electronic device causing it to display a welcome interactive shopping interface page to Jane. Upon parking her vehicle, the shopping application detects a change in speed and asks her to identify and input her parking spot number that identifies her vehicle location (to have a drop-off point for a porter or locker delivery). Or, if she chooses to valet park, she provides the valet attendant with her unique shopping system identifier. The valet is equipped with a service client device through which the valet can input her identifier to allow the server 402 to associate Jane's vehicle with Jane and her product purchases to and allow such product purchases to be placed in her vehicle by shopping system personnel.

Upon exiting her vehicle, Jane is guided via navigation related interactive shopping interface pages and other on-site communication technology (e.g., proximity sensing mechanisms 132) interacting with the customer client device application to the shoe store showroom that sells the shoe she found via the Internet and, once she is in the showroom, such pages further navigate her to the exact location at which the specific shoe is displayed.

The products are displayed in the showroom(s) in a manner that provides for maximum quantity of products displayed and shopper comfort. In the exemplary embodiment, the showroom would not contain piles of boxes or shoes out of place, but rather an orderly intuitive layout. Upon arriving at the location of the shoe she selected via the shopping system customer application, she views one of the shoes and holds it in her hands. Jane is glad that she didn't merely buy it online without visiting facility 106 and the respective showroom, because she is now assured that she likes how it looks in person. However, as she puts down the first shoe, another shoe catches her eye. Holding the second shoe in her hand and matching it to her dress, she is sure that this second shoe is the right shoe for her. As the sample shoe on display is not her size, she uses here shopping system application to notify the shopping system application that she wishes to view the product, and she electronically requests the shoes in two different sizes that may fit to be sent to her location. Within minutes, even though she moved from her spot by about 30 feet or so, a friendly attendant taps her on the shoulder and hands her two shoe boxes.

The attendant could find her because the shopping system 100 pinpointed her location. Had she wanted to, Jane could have gone to a designated viewing area and picked up the shoes herself view the shoes, but on the shopping system mobile application, she selected to have a store concierge bring them to her so that her shopping experience could continue uninterrupted. Upon trying on the shoes, Jane selects the shoe that fits, and adds it to her virtual cart via her shopping system mobile application. This causes the physical shoes to be placed in a customer product area 126 dedicated to Jane. Then, she selects a remote delivery option of valet delivery (i.e., upon purchase, the product will be put in her vehicle trunk by a shopping system valet). Thereafter, the shoes are held in Jane's dedicated customer product area 126 until such time that the mobile application receives notification and/or itself detects that she has left the facility and the area proximal thereto, at which point the mobile application prompts Jane to remove the product from her virtual cart, purchase the product, or save the product for checkout via her mobile customer client device or another customer client device, for example, her home personal computer.

While Jane is enjoying a stress-free shopping experience, she does not realize the efforts being made by the shopping system employees and/or robotics to enable such a pleasurable experience. The moment she entered the facility 106, a picker 154 in the primary product storage area 108 was allocated to her either exclusively or the picker was shared between Jane and a limited number of other shoppers. This allocated picker monitors her actions and serves her needs at every step. So, when she requested a specific pair of shoes in two sizes to try on via her customer client device, this picker 154 found the product in the primary product storage area 112, possibly via accessing the inventory control system 114 (when included) and delivered it to the transport system 112 that took it from halfway back in the primary product storage area 108 to a location within the shoe showroom less than ten feet from where she was located. When the shoes were returned to the primary product storage area 108, the picker returned the wrong size to its designated storage location and placed the pair of shoes Jane added to her virtual cart into the physical customer product area 126 allocated to Jane.

After leaving the shoe showroom, Jane decides to visit the nearby clothing showroom she found on the directory interactive shopping interface page provided to her by her shopping system application via her customer client devices 138. The picker 154 is aware of Jane's new location and awaits the next command from Jane's shopping system application, which will be transmitted to his service client device 152 through a from a server such as server 402 via a communication channel such as communication channel 512 and a network such as network 410. Even though Jane has yet to check out from the shoe showroom, the physical items that correspond to the virtual items she selected and added to her virtual cart have been placed in her dedicated customer product area 126 with any other previously selected items so that she can checkout upon completing all of her shopping at the facility 106. She can checkout and purchase all of her items at once without the need to carry any of the products from location to location as she continues her shopping trip.

In some embodiments of the present invention, upon entering the clothing showroom, Jane enters a sizing booth which uses advanced technologies to scan her body and generate a size profile and body type which may be stored on her customer client device and also simultaneously transmitted to a server 402 for storage in a content store such as customer data content store 522*e*. Alternatively, Jane can enter her sizing preferences, which may similarly be saved for future use on her customer client device and/or the remote server content store.

Next, she may walk around the showroom, simply scanning tags of apparel she wishes to select via her customer client device. Her customer client device also provides her with recommendation style interactive shopping interface pages that make apparel recommendations to her based on her body type, previously selected apparel, or general preference selections selected by Jane. When she has selected all of the desired apparel, she reserves a changing room through a changing room selection interactive shopping interface page. Upon reaching the reserved changing room, Jane finds it stocked with all of the apparel selections she made. What Jane is unaware of, is that while she was scanning apparel with her customer client device to add to the dressing room, her allocated picker 54 in the primary product storage area 108 was hard at work gathering the apparel as it was being selected.

Upon trying on her apparel and deciding what apparel she wants to buy and what she will pass on, Jane can either modify her virtual cart to include those she wants one at a time via her mobile shopping system application, or she can hang up the apparel she wishes to keep on a "buy" hook or rod, and the remaining on a return hook/rod. Upon leaving the dressing room, the hook/rod system returns the clothing to the picker 154 allocated to Jane and automatically adds all items on the Buy hook/rod to Jane's virtual cart. Jane can then select (on a product by product basis), the delivery methods for each of the selected products. She can also select various criteria for such delivery methods. For example, on a product by product basis, Jane can determine the locations within her vehicle a valet should locate her purchased products, for example, trunk, hook in the back, lay flat on the front seat, etc.

Almost finished with her shopping for the day, it is now lunchtime, and Jane is hungry. She selects a meal option on her customer client device and is provide with a plurality of restaurant related interactive shopping interface pages to provide her with restaurant selections based upon criteria including, but not limited to, cuisine type, location, menu item, and the like. Jane is happy. If she were shopping at a conventional shopping center, she would be carrying around three bags and a suit-bag and would have to drag it to her car before settling down in a restaurant. As a matter of a fact, chances are, Jane would go to her car, sit in the driver's seat and merely drive home. But not today. Today, Jane is enjoying the stress-free, hands-free experience provided by shopping systems of the present invention such as shopping system 100.

Following lunch, Jane enjoys the recreational facilities 128 of shopping system 100 by having her nails done at the system's nail salon and then catching a movie at the shopping system's theater. Fully relaxed, Jane wonders what to do. She can get in her car, travel home, continue shopping via the Internet from the comfort of her home, and purchase her order from home and have it delivered either within the hour or via standard courier. However, Jane decides that before she leaves, she should seek a dresser for her bedroom. Entering the desired dresser dimensions into the shopping system mobile application, Jane is directed to one of two furniture showrooms and to the exact locations within the showrooms at which dressers having the requested dimensions are located. Jane views the dressers, feels the quality and adds one of the dressers to her virtual cart. The dresser is too large for her car, so she selects to have it delivered preferably immediately after she leaves facility 106.

It is then that Jane purchases her items via the mobile application on her customer client device and proceeds to valet parking. Her car is already waiting for her with all the purchased products loaded into the car. Upon arriving home, the delivery truck with the dresser is in her driveway and the delivery men are waiting to bring it into the house.

Figure 6:
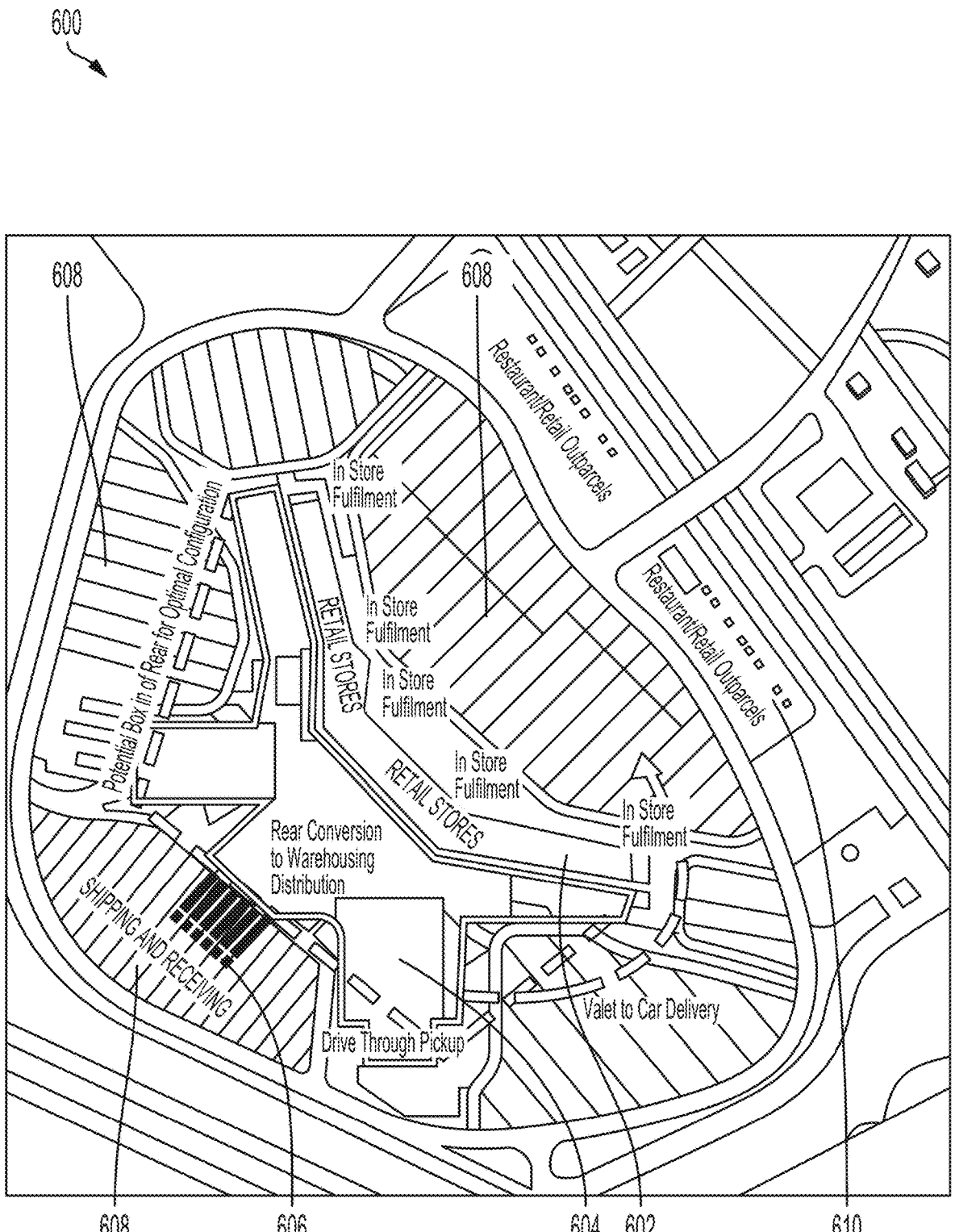
FIG. 6 depicts an example of an existing indoor mall to shopping system conversion concept.

Turning now to FIG. 6, depicted is an exemplary conversion 600 of an existing indoor shopping mall to a shopping system of the present invention. In this exemplary embodiment, a first longitudinal side 602 of the existing mall is designated as a location for a plurality of showrooms such as showrooms 110 of FIG. 1. These showrooms offer in-store fulfillment of both in store and online purchases as described herein.

The remaining area 604 of the existing mall are repurposed as the primary product storage area 108 and delivery location 124 of FIG. 1 which offers the various features described herein including, but not limited to warehousing and product distribution features and various customer product delivery options. A first portion 606 of parking lot 608 of the existing mall adjacent to the primary product storage area 108 may be repurposed as shipping and receiving areas such as shipping 118 and receiving 120 as shown in FIG. 1 and discussed herein.

Remote parking areas 610 may be repurposed as recreational facilities 128 (FIG. 1) and/or showroom outparcels without departing from the scope hereof.

Although several processes have been disclosed herein as software, it may be appreciated by one of skill in the art that the same processes, functions, etc. may be performed via hardware or a combination of hardware and software. Similarly, although the present invention has been depicted as a wireless systems, these concepts may be applied to hard-wired systems and hybrid hardwired and wireless systems without departing from the scope of the present invention.

While the present invention has been illustrated by description of various embodiments and while those embodiments have been described in considerable detail, it is not the intention of applicant to restrict or in any way limit the scope of the invention to such details. Additional advantages and modifications will readily appear to those skilled in the art. The invention in its broader aspects is therefore not limited to the specific details and illustrative examples shown and described. Accordingly, departures may be made from such details without departing from the spirit or scope of the invention.

The invention claimed is:

1. A shopping system for fulfilling an order received from a customer, the shopping system comprising:
   a primary product storage area adapted to store a plurality of products offered for sale;
   at least one showroom or display, the at least one showroom or display adapted to display at least a subset of the products stored in the primary product storage area;
   at least one delivery location;
   a transport system including a robotic device; and
   a network server in operational communication with the transport system, the network server configured to receive information associated with selected products that were selected by the customer and generate picking instructions in accordance with the selected products in response to data from a client device associated with the customer;
   wherein the robotic device is configured to receive the picking instructions from the network server and to transport the selected products from the primary product storage area to the at least one delivery location, wherefrom the selected products will be provided or delivered to the customer or an intended recipient.

2. The system of claim 1, wherein the intended recipient includes one of the customer, another person the customer indicates, or an individual or device tasked with the delivery of the product.

3. The system of claim 1, wherein the at least one showroom or display includes goods from multiple sellers.

4. The system of claim 1, wherein the client device includes a proximity sensing mechanism.

5. The system of claim 1, wherein the client device is configured to receive the order from the customer and to transmit the order to the network server.

6. The system of claim 1, wherein the robotic device is configured to transport the selected products from the primary product storage area to the at least one delivery location without intervention of a human.

7. The system of claim 1, wherein the robotic device receives revised picking instructions and subsequently transports a product from the at least one delivery location back to the primary product storage area.

8. The system of claim 1, wherein the client device is configured to permit the customer to select one or more selected products from the plurality of products to add to a virtual cart, the order including the selected products added to the virtual cart.

9. The system of claim 8, wherein software of the network server is configured to direct the transport system to transport the selected products to a customer product area within the primary product storage area after the customer adds the selected products to the virtual cart and before the customer places the order, the software further configured to direct the transport system to transport the selected products from the customer product area to the at least one delivery location after the customer places the order.

10. The system of claim 1, wherein the client device is operable to receive and display interactive shopping interface pages transmitted from the network server, the interactive shopping interface pages selectively displaying product information about the products and other product recommendations based on historical customer data collected by the client device.

11. A computer-implemented method comprising:
storing, at a primary product storage area, a plurality of products offered for sale;
displaying, in a showroom or display, at least a subset of the products stored in the primary product storage area;
receiving, at a network server, information associated with selected products that were selected by a customer;
generating, at the network server, picking instructions in accordance with the selected products in response to data from a client device associated with the customer;
receiving, by a robotic device, the picking instructions from the network server; and
transporting, by the robotic device, the selected products from the primary product storage area to at least one delivery location, wherefrom the selected products will be provided or delivered to the customer or an intended recipient.

12. The method of claim 11, wherein the intended recipient includes one of the customer, another person the customer indicates, or an individual or device tasked with the delivery of the product.

13. The method of claim 11, wherein a showroom or display includes goods from multiple sellers.

14. The method of claim 11, wherein the client device includes a proximity sensing mechanism.

15. The method of claim 11, wherein the client device is configured to receive an order from the customer and to transmit the order to the network server.

16. The method of claim 11, wherein the robotic device is configured to transport the selected products from the primary product storage area to the at least one delivery location without intervention of a human.

17. The method of claim 11, wherein the robotic device receives revised picking instructions and subsequently transports a product from the at least one delivery location back to the primary product storage area.

18. The method of claim 11, wherein the client device is configured to permit the customer to select one or more selected products from the plurality of products to add to a virtual cart, an order including the selected products added to the virtual cart.

19. The method of claim 18, wherein software of the network server is configured to direct the robotic device to transport the selected products to a customer product area within the primary product storage area after the customer adds the selected products to the virtual cart and before the customer places the order, the software further configured to direct the robotic device to transport the selected products from the customer product area to the at least one delivery location after the customer places the order.

20. The method of claim 11, wherein the client device is operable to receive and display interactive shopping interface pages transmitted from the network server, the interactive shopping interface pages selectively displaying product information about the products and other product recommendations based on historical customer data collected by the client device.

* * * * *